United States Patent [19]

Smith

[11] Patent Number: 5,588,915

[45] Date of Patent: Dec. 31, 1996

[54] SEAL AND SEAL GUARD ASSEMBLY FOR UNIVERSAL JOINT

[75] Inventor: Johnny N. Smith, Toledo, Ohio

[73] Assignee: Dana Corporation, Toledo, Ohio

[21] Appl. No.: 578,273

[22] Filed: Dec. 26, 1995

[51] Int. Cl.[6] .............................. F16C 33/76; F16D 3/41; F16J 15/32
[52] U.S. Cl. .............................................. 464/14; 464/131
[58] Field of Search .................................. 277/37, 47, 152, 277/183, 189, 178, 215; 464/14, 128, 130–32, 136; 384/484, 486

[56] References Cited

U.S. PATENT DOCUMENTS

| | | |
|---|---|---|
| 2,802,351 | 8/1957 | Anderson . |
| 2,873,153 | 2/1959 | Haynie ..................................... 384/484 |
| 2,896,432 | 7/1959 | Hempel . |
| 2,996,901 | 8/1961 | Kleinschmidt .......................... 464/131 |
| 3,108,815 | 10/1963 | Haynie et al. ............................. 277/37 |
| 3,138,942 | 6/1964 | Kayser . |
| 3,200,615 | 8/1965 | Stokely . |
| 3,306,683 | 2/1967 | Deuring ................................... 277/183 |
| 3,594,050 | 7/1971 | Gothberg ................................. 384/484 |
| 3,606,352 | 9/1971 | Lutz ......................................... 277/183 |
| 4,515,574 | 5/1985 | Mazziotti . |
| 4,710,150 | 12/1987 | Mangiavacchi ......................... 277/183 |
| 4,874,349 | 10/1989 | Gall . |
| 4,932,923 | 6/1990 | Thompson . |
| 5,188,564 | 2/1993 | Keller . |
| 5,230,660 | 7/1993 | Warnke .................................... 277/189 |
| 5,288,272 | 2/1994 | Marriott et al. . |

FOREIGN PATENT DOCUMENTS

| | | |
|---|---|---|
| 4041498 | 6/1992 | Germany ................................. 277/183 |

Primary Examiner—Scott Cummings
Attorney, Agent, or Firm—MacMillian, Sobanski & Todd

[57] ABSTRACT

A seal and guard assembly for a bearing cup assembly in a universal joint includes an annular seal assembly provided about the open end of a bearing cup. The seal assembly includes a metallic support ring and an elastomeric seal. The support ring is generally Z-shaped in cross section, having upper and lower radially extending flange portions which are connected together by an axially extending intermediate portion. The intermediate portion of the support ring is press fit within the inner bearing surface of the bearing cup. The upper flange portion of the support ring extends radially inwardly from the intermediate portion. The lower flange portion of the support ring extends radially outwardly from the intermediate portion adjacent the open end of the S bearing cup. The elastomeric seal is disposed within the intermediate portion of the support ring and is attached thereto. An annular seal guard is removably secured to the seal assembly. The seal guard is generally L-shaped in cross section, including an axially extending body portion, which extends about the lower radially extending flange portion of the support ring, and a radially inwardly extending flange portion. The upper end of the axially extending body portion terminates in a plurality of relatively small, radially inwardly extending protrusions. The protrusions define an inner diameter which is slightly smaller than the outer diameter defined by the lower radially extending flange portion of the support ring. Thus, the outer circumferential edge of the lower radially extending flange portion of the support ring is trapped between the upper protrusions and the lower radially extending flange portion to releasably secure the seal guard to the seal assembly.

20 Claims, 2 Drawing Sheets

SEAL AND SEAL GUARD ASSEMBLY FOR UNIVERSAL JOINT

BACKGROUND OF THE INVENTION

This invention relates in general to universal joints for vehicle drive train systems. More specifically, this invention relates to an improved structure for a seal and seal guard assembly adapted for use in such a universal joint.

Universal joints are well known devices which provide a driving connection between two members adapted to rotate about non-aligned axes of rotation. Universal joints are widely used between rotatable drive shaft sections in vehicle drive train systems. A typical universal joint includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or similar means are provided between the outer cylindrical surfaces of the trunnions and the inner cylindrical surfaces of the bearing cups to facilitate relatively low friction rotational movement therebetween. The bearing cups which are mounted on a first opposed pair of the trunnions are connected to a first end yoke which, in turn, is secured to an end of a first drive shaft section or other component of the vehicle drive train system. Similarly, the bearing cups mounted on a second opposed pair of the trunnions are connected to a second end yoke which, in turn, is secured to an end of a first drive shaft section or other component of the vehicle drive train system.

Typically, each of the trunnions has an internal lubricant passageway formed therein. The lubricant passageways communicate with a central cavity formed in the body of the cross. An external lubricant fitting is mounted in an aperture formed through the body of the cross to provide one-way fluid communication into the central cavity. Thus, lubricant injected into the cross through the fitting flows outwardly from the central cavity through each of the lubricant passageways to the bearing cups mounted on the ends of the trunnions. The lubricant passes around the outer ends of the trunnions and inwardly back between the outer cylindrical surfaces of the trunnions and the inner cylindrical surfaces of the bearing cups. In this manner, the needle bearings can be lubricated for use.

It is known to provide elastomeric seals within or about the open ends of the bearing cups to retain the lubricant in the regions of the universal joint where the needle bearings are located, and further to minimize the entry of dirt, water, or other contaminants therein. Additionally, it is also known to provide rigid guards within or about the open ends of the bearing cups to prevent the entry of dirt, water, or other contaminants into the regions of the universal joint where the needle bearings are located and to protectively cover the elastomeric seals. In some instances, the seals and the guards are combined into a single seal and guard assembly. A number of conventional seals, guards, and seal and guard assemblies are known in the art. However, known structures have been found to be unduly complex and somewhat difficult to assemble. Thus, it would be desirable to provide an improved structure for a seal and guard assembly which is simple and inexpensive in construction and assembly.

SUMMARY OF THE INVENTION

This invention relates to an improved structure for a seal and guard assembly for a universal joint. A cross for the universal joint includes a central body portion having a plurality of trunnions extending outwardly therefrom. A bearing cup assembly is mounted about each of the trunnions. Each bearing cup assembly includes a hollow cylindrical bearing cup having a closed end, an open end, and an inner bearing surface. A plurality of needle bearings is disposed between the trunnion and its associated bearing cup to permit the bearing cup to rotate relative thereto. An annular seal assembly is provided about the open end of the bearing cup. The seal assembly includes a metallic support ring and an elastomeric seal. The support ring is generally Z-shaped in cross section, having upper and lower radially extending flange portions which are connected together by an axially extending intermediate portion. The intermediate portion of the support ring is press fit within the inner bearing surface of the bearing cup. The upper flange portion of the support ring extends radially inwardly from the intermediate portion and functions to support the lower ends of the needle bearings. The lower flange portion of the support ring extends radially outwardly from the intermediate portion adjacent the open end of the bearing cup. The elastomeric seal is disposed within the intermediate portion of the support ring and is attached thereto by any conventional means, such as by adhesive bonding. An annular seal guard is removably secured to the seal assembly. The seal guard is generally L-shaped in cross section, including an axially extending body portion, which extends about the lower radially extending flange portion of the support ring, and a radially inwardly extending flange portion. The upper end of the axially extending body portion terminates in a plurality of relatively small, radially inwardly extending protrusions. The protrusions define an inner diameter which is slightly smaller than the outer diameter defined by the lower radially extending flange portion of the support ring. Thus, the outer circumferential edge of the lower radially extending flange portion of the support ring is trapped between the upper protrusions and the lower radially extending flange portion to releasably secure the seal guard to the seal assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
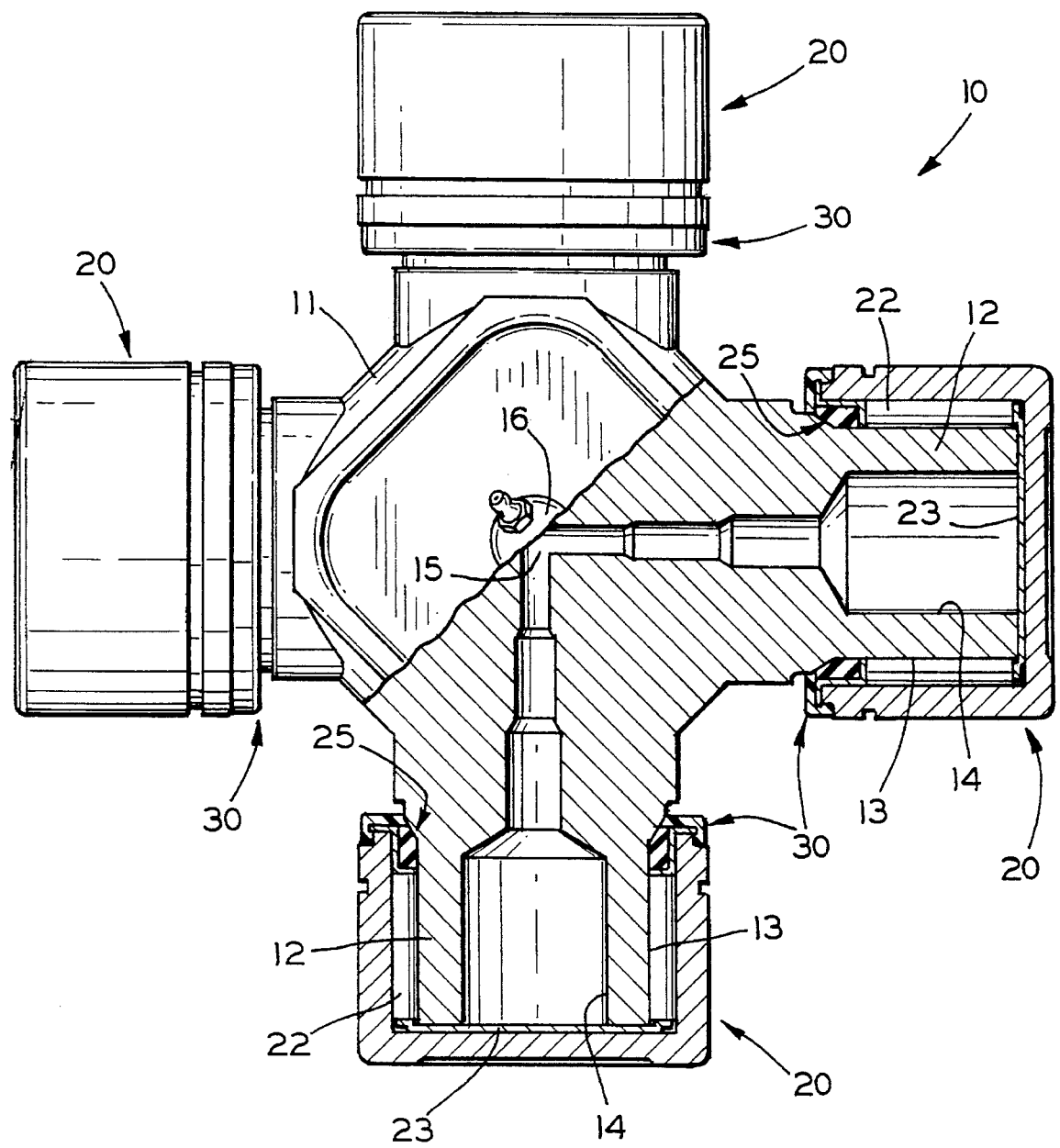
FIG. 1 is an elevational view, partially in cross section, of a cross for a universal joint in accordance with this invention.

Referring now to the drawings, there is illustrated in FIG. 1 a cross, indicated generally at 10, in accordance with this invention. The cross 10 is adapted to form a portion of a conventional universal joint assembly (not shown), the structure and operation of which is well known in the art. The cross 10 includes a central body portion 11 having a plurality of trunnions 12 extending outwardly therefrom. In the illustrated embodiment, four of such trunnions 12 are formed integrally with the body portion 11. The trunnions 12 are disposed at right angles relative to one another and are oriented so as to lie in a single plane. The trunnions 12 are generally hollow and cylindrical in shape and define respective axes therethrough. Each of the trunnions 12 terminates in an end portion having a cylindrical outer bearing surface 13. A passageway 14 is formed through each of the trunnions 12 extending outwardly from the body portion 11. The passageways 14 all communicate with a central cavity 15 formed in the body portion 11. A conventional lubricant fitting 16 is disposed in a central aperture (not shown) formed through the body portion 11. The central aperture communicates with the central cavity 15 of the body portion 11.

Figure 2:
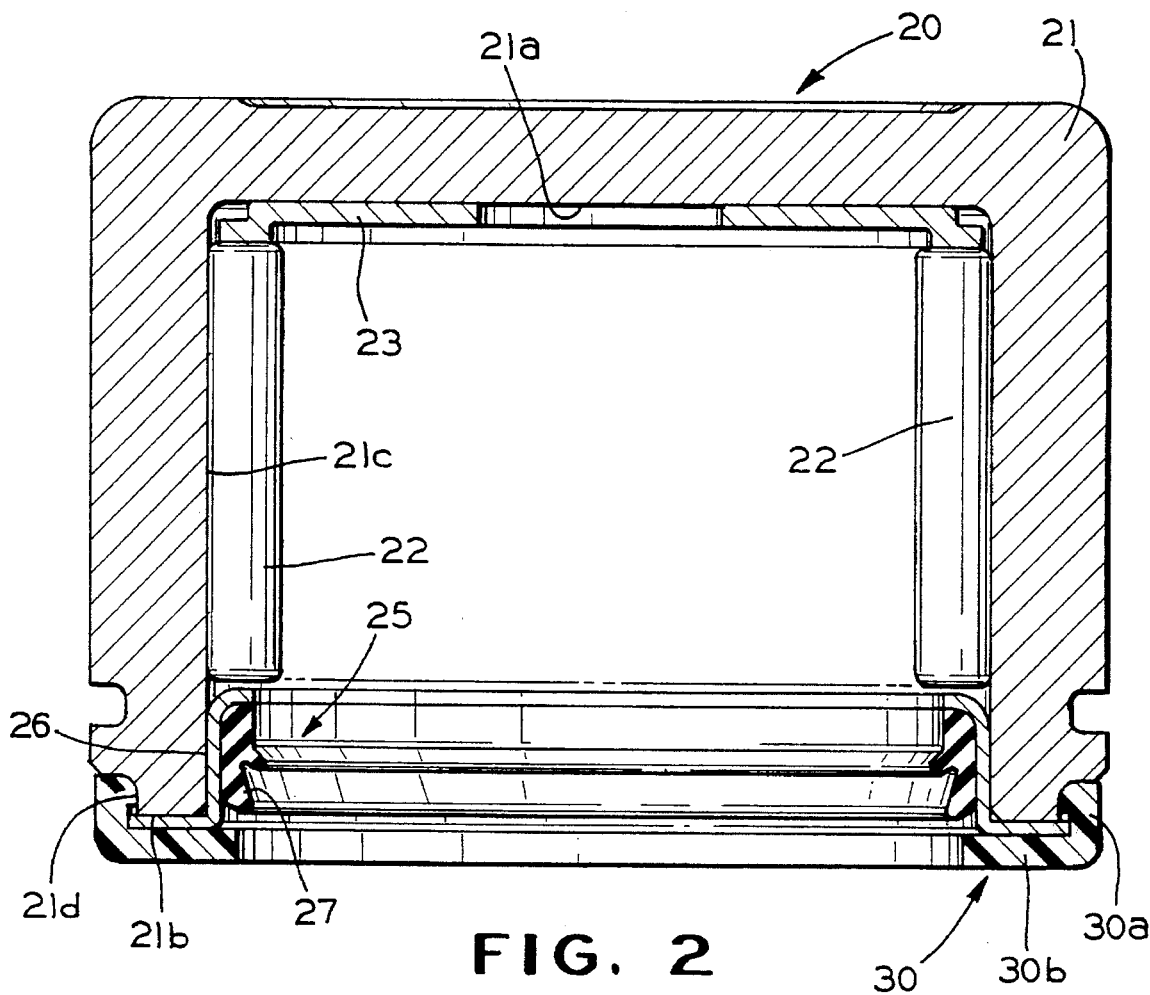
FIG. 2 is an enlarged sectional elevational view of one of the bearing cup assemblies of the cross member illustrated in FIG. 1 including a bearing cup, a thrust plate, a plurality of bearings, and a seal and guard assembly.

A bearing cup assembly, indicated generally at 20, is mounted about each of the outer bearing surfaces 13 of the trunnions 12. As best shown in FIG. 2, each of the bearing cup assemblies 20 includes a hollow cylindrical bearing cup 21 having a closed end 21a, an open end 21b, and a cylindrical inner bearing surface 21c. The bearing cup 21 further includes a reduced outer diameter portion 21d located adjacent to the open end 21b thereof. When mounted about the trunnion 12, the closed end 21a of the bearing cup 21 is disposed adjacent to the end of the trunnion 12, while the inner bearing surface 21c of the bearing cup 21 is disposed co-axially about the outer bearing surface of the trunnion 12.

The inner diameter of the bearing surface 21c of the bearing cup 21 is somewhat larger than the outer diameter of the bearing surface 13 of the trunnions 12. As a result, respective pluralities of conventional needle or roller bearings 22 (only two are illustrated about each of the trunnions 12) may be disposed therebetween in a known manner. The needle bearings 21 are oriented co-axially with the axis defined by the cylindrical trunnions 12 and are arranged in a circumferential array thereabout. As is well known, the needle bearings 21 permit the bearing cup 21 to rotate about the trunnion 12. A thrust plate 23 may be disposed between the upper ends of the needle bearings 21 and the closed end 21a of the bearing cup 21. The thrust plate 23 is conventional in the art.

An annular seal assembly, indicated generally at 25, is provided about the open end 21b of the bearing cup 21. As best shown in FIG. 2, the seal assembly 25 includes a metallic support ring 26 and an elastomeric seal 27. The support ring 26 is generally Z-shaped in cross section, having upper and lower radially extending flange portions which are connected together by an axially extending intermediate portion. The intermediate portion of the support ring 26 is formed having an outer diameter which is approximately equal to the inner diameter of the bearing surface 21c of the bearing cup 21. Thus, the support ring 26 can be pressed into the inner bearing surface 21c of the bearing cup 21 and retained therein by friction. The upper flange portion of the support ring 26 extends radially inwardly from the intermediate portion and functions to support the lower ends of the needle bearings 22. The lower flange portion of the support ring 26 extends radially outwardly from the intermediate portion adjacent the open end 21b of the bearing cup 21 and functions as a positive stop when the support ring 26 is pressed therein. The elastomeric seal 27 is disposed within the intermediate portion of the support ring 26 and is attached thereto by any conventional means, such as by adhesive bonding. The elastomeric seal 27 is conventional and may include a pair of sealing lips which extend radially inwardly. The sealing lips are provided to sealingly engage the outer cylindrical surfaces 13 of the trunnions 12 when the bearing cup 21 is mounted thereabout.

An annular seal guard, indicated generally at 30, is removably secured to the seal assembly 25. The seal guard 30 is formed from a relatively stiff, but somewhat flexible, plastic material, such as is commercially available under the designation Xenoy 5123. The seal guard 30 is generally L-shaped in cross section and includes an axially extending body portion 30a and a radially inwardly extending flange portion 30b. As best shown in FIG. 2, the axially extending body portion 30a defines an inner diameter which is slightly larger than the outer diameter defined by the circumferential edge of the lower radially extending flange portion of the support ring 26. Thus, the axially extending portion 30a can extend relatively loosely about the outer circumferential edge of the lower radially extending flange portion of the support ring 26.

Figure 3:
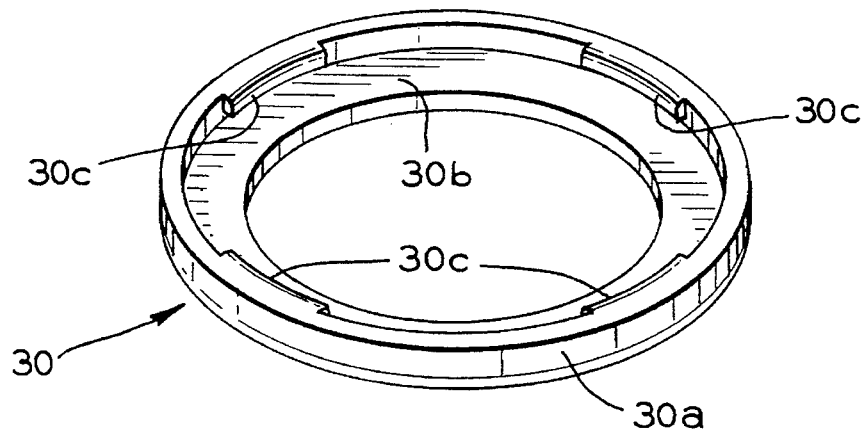
FIG. 3 is a perspective view of the seal guard of the seal and guard assembly illustrated in FIGS. 1 and 2.

Referring to the seal guard 30 illustrated in FIG. 3, it can be seen that the upper end of the axially extending body portion 30a terminates in a plurality of relatively small, radially inwardly extending protrusions 30c. In the illustrated embodiment, four of such protrusions 30c are formed integrally with the axially extending body portion 30a. The illustrated protrusions 30c are uniformly sized and spaced about the circumference of the axially extending body portion 30a. However, it will be appreciated that the seal guard 30 may be provided with any number of protrusions 30c, and that such protrusions need not be uniformly sized or spaced. The protrusions 30c define an inner diameter which is slightly smaller than the outer diameter defined by the outer circumferential edge of the lower radially extending flange portion of the support ring 26.

The assembly of the universal joint cross 10 will now be explained. Initially, the roller bearings 22 are assembled within the bearing cup 21 in a conventional manner. The seal assembly 25 is next pressed into frictional engagement with the inner bearing surface 21c of the bearing cup 21 until the lower flange portion of the support ring 26 abuts the open end 21b of the bearing cup 21. The seal guard 30 is then snapped onto the open end 21b of the bearing cup 21 by moving it axially toward the seal assembly 25. Because the inner diameter defined by the protrusions 30c is slightly smaller than the outer diameter defined by the outer circumferential edge of the support ring 26, the protrusions 30c are initially deflected radially outwardly to pass over the lower radially outwardly extending flange portion of the support ring 26. The inner circumferential surfaces of the protrusions 30c may be curved or tapered to facilitate this engagement and deflection. Further axial movement of the seal guard 30 causes the protrusions 30c to snap inwardly over the lower radially extending flange portion of the support ring 26, as shown in FIGS. 1 and 2, and into the reduced outer diameter portion 21d of the bearing cup 21. As a result, the outer circumferential edge of the support ring 26 is trapped between the upper protrusions 30c and the lower radially extending flange portion 30b of the seal guard 30. As mentioned above, the inner diameter of the axially extending portion 30a of the seal guard 30 is slightly larger than the outer diameters of the lower radially extending flange portion of the support ring 26. Thus, the seal guard 30 fits somewhat loosely thereon. Because it is formed from a somewhat flexible material, the seal guard 30 may be removed from the seal assembly 25 after being installed thereon simply by prying it off. Lastly, the bearing cup 21 is assembled onto the trunnion 12 by disposing the open end 21b thereof over the end of the trunnion 12 and moving it axially inwardly toward the body portion 11. Preferably, the radially inwardly extending flange portion 30b of the seal guard 30 defines an inner diameter which is slightly smaller than the outer diameter of the trunnion 12. As a result, when the bearing cup 21 is installed on the trunnion 12 as described above, the seal guard 30 engages the trunnion 12 in a light press fit relationship. This light press fit arrangement functions to retain the bearing cup assembly 20 on the trunnion 12 during shipment and use.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A bearing cup assembly adapted for use with a cross member of a universal joint comprising:

a hollow bearing cup including an open end, a reduced diameter portion located adjacent to said open end, an inner bearing surface, and a closed end;

a seal assembly secured to said bearing cup and including a support ring and a seal secured to said support ring, said support ring including an axially extending portion and a radially extending flange portion; and a seal guard secured to said seal assembly, said seal guard including a body portion and a protrusion extending from said body portion into said reduced diameter portion of said bearing cup, said radially extending flange portion of said support ring being trapped between said body portion and said protrusion of said seal guard to secure said seal guard to said seal assembly.

2. The bearing cup assembly defined in claim 1 wherein said reduced diameter portion extends circumferentially about said open end of said bearing cup.

3. The bearing cup assembly defined in claim 1 wherein said axially extending portion of said support ring is press fit within said inner bearing surface of said bearing cup.

4. The bearing cup assembly defined in claim 1 wherein said radially extending flange portion of said support ring is a radially outwardly extending flange portion.

5. The bearing cup assembly deemed in claim 4 wherein said support ring further includes a radially inwardly extending flange portion.

6. The bearing cup assembly defined in claim 1 wherein said seal is secured to said axially extending portion of said support ring.

7. The bearing cup assembly defined in claim 1 wherein said seal guard includes a plurality of protrusions extending from said body portion.

8. The bearing cup assembly defined in claim 7 wherein each of said plurality of protrusions extends from said body portion into said reduced diameter portion of said bearing cup.

9. The bearing cup assembly defined in claim 1 wherein said seal guard includes an axially extending body portion, a flange portion extending from said body portion, and a protrusion extending from said body portion and into said reduced diameter portion of said bearing cup.

10. The bearing cup assembly defined in claim 9 wherein said radially extending flange portion of said support ring is trapped between said flange portion and said protrusion of said body portion to secure said seal guard to said seal assembly.

11. A cross for a universal joint comprising:

a body portion including an outwardly extending trunnion having an outer bearing surface;

a hollow bearing cup including an open end, a reduced diameter portion located adjacent to said open end, an inner bearing surface disposed about said trunnion, and a closed end;

a plurality of bearings disposed between said inner bearing surface of said bearing cup and said outer bearing surface of said trunnion for facilitating rotation of said bearing cup relative to said trunnion;

a seal assembly secured to said bearing cup and including a support ring and a seal secured to said support ring, said support ring including an axially extending portion and a radially extending flange portion; and a seal guard secured to said seal assembly, said seal guard including a body portion and a protrusion extending from said body portion into said reduced diameter portion of said bearing cup, said radially extending flange portion of said support ring being trapped between said body portion and said protrusion of said seal guard to secure said seal guard to said seal assembly.

12. The universal joint cross defined in claim 11 wherein said reduced diameter portion extends circumferentially about said open end of said bearing cup.

13. The universal joint cross defined in claim 11 wherein said axially extending portion of said support ring is press fit within said inner bearing surface of said bearing cup.

14. The universal joint cross defined in claim 11 wherein said radially extending flange portion of said support ring is a radially outwardly extending flange portion.

15. The universal joint cross defined in claim 14 wherein said support ring further includes a radially inwardly extending flange portion.

16. The universal joint cross defined in claim 11 wherein said seal is secured to said axially extending portion of said support ring.

17. The universal joint cross defined in claim 11 wherein said seal guard includes a plurality of protrusions extending from said body portion.

18. The universal joint cross defined in claim 17 wherein each of said plurality of protrusions extends from said body portion into said reduced diameter portion of said bearing cup.

19. The universal joint cross defined in claim 11 wherein said seal guard includes an axially extending body portion, a flange portion extending from said body portion, and a protrusion extending from said body portion and into said reduced diameter portion of said bearing cup.

20. The universal joint cross defined in claim 19 wherein said radially extending flange portion of said support ring is trapped between said flange portion and said protrusion of said body portion to secure said seal guard to said seal assembly.

* * * * *